(12) United States Patent
Moradell-Casellas

(10) Patent No.: US 8,979,078 B2
(45) Date of Patent: Mar. 17, 2015

(54) VIBRATION DAMPER FOR AIRCRAFT NACELLE

(75) Inventor: Pierre Moradell-Casellas, Saint-Georges des Groseilles (FR)

(73) Assignee: Aircelle, Gonfreville l'Orcher (FR)

( * ) Notice: Subject to any disclaimer, the term of this patent is extended or adjusted under 35 U.S.C. 154(b) by 469 days.

(21) Appl. No.: 12/674,269

(22) PCT Filed: Aug. 1, 2008

(86) PCT No.: PCT/FR2008/001150
§ 371 (c)(1),
(2), (4) Date: Feb. 19, 2010

(87) PCT Pub. No.: WO2009/053546
PCT Pub. Date: Apr. 30, 2009

(65) Prior Publication Data
US 2010/0164153 A1 Jul. 1, 2010

(30) Foreign Application Priority Data
Aug. 20, 2007 (FR) ...................... 07 05897

(51) Int. Cl.
*F16F 7/00* (2006.01)
*F16F 1/371* (2006.01)

(52) U.S. Cl.
CPC ......... *F16F 1/3713* (2013.01); *F16F 2230/007* (2013.01)
USPC ....................................... 267/141

(58) Field of Classification Search
USPC ............................. 267/140–141.7
See application file for complete search history.

(56) References Cited

U.S. PATENT DOCUMENTS

| | | | | |
|---|---|---|---|---|
| 5,116,030 A * | 5/1992 | Nowak et al. | ............... | 267/140.4 |
| 6,394,434 B2 * | 5/2002 | Wolf et al. | ................... | 267/141 |
| 7,048,265 B2 * | 5/2006 | Huprikar | .................... | 267/141.1 |
| 2002/0145241 A1* | 10/2002 | Rawson | ..................... | 267/141.7 |
| 2005/0035511 A1* | 2/2005 | Friedrich et al. | ........... | 267/141.2 |

FOREIGN PATENT DOCUMENTS

| | | |
|---|---|---|
| EP | 1026420 A1 | 8/2000 |
| EP | 1703188 A1 | 9/2006 |
| GB | 773132 | 4/1957 |
| JP | 5919741 A | 2/1984 |

OTHER PUBLICATIONS

International Search Report PCT/FR2008/001150; Dated Apr. 22, 2009.

* cited by examiner

*Primary Examiner* — Vishal Sahni
(74) *Attorney, Agent, or Firm* — Brinks Gilson & Lione

(57) ABSTRACT

The invention relates to a vibration damper (5) that can be provided between an electronic housing (1) and the fixed structure of an aircraft nacelle (3). It comprises a block of an elastic material (10), a screw (7) for securing the block (10) to said fixed structure (3), and means (11, 29a, 29b) for securing said housing (1) onto said block (10). It is characterized in that it comprises means (13, 15) for limiting the travel of said attachment means (11, 29a, 29b) relative to said securing screw (7) in at least two directions of the space, wherein the limitation means (13, 15) are sized so as to prevent any strain on the screw (7) that could lead to the fatigue and/or breakage thereof.

11 Claims, 1 Drawing Sheet

VIBRATION DAMPER FOR AIRCRAFT NACELLE

TECHNICAL FIELD

The present invention relates to a vibration damper for a module installed on an aircraft nacelle.

BACKGROUND

A vibration damper is known from the prior art that is capable of being interposed between an electronic module and a fixed structure of an aircraft nacelle, comprising a block made of elastic material, a screw for fastening this block to said fixed structure, and means for fastening said module to said block.

The electronic module typically may be a module for controlling various functions of the nacelle, such as the function for opening a portion of the nacelle for maintenance operations.

The vibration dampers make it possible to protect the electronic components of this module from the vibrations generated by the turbojet situated inside the nacelle.

When a blade of the turbojet breaks accidentally (a situation known to those skilled in the art under the abbreviation FBO, for "Fan Blade Out"), the vibrations generated by the turbojet reach very high amplitudes that may in particular lead to the destruction of the dampers and to the resulting separation of the electronic module from the fixed structure of the nacelle.

Such a separation is unacceptable because then the electronic module is likely to damage other members of the nacelle and of the engine.

In order to prevent such a separation, conventionally a safety yoke, which is fastened by its two ends to the fixed structure of the nacelle is placed over the damper.

Such a yoke makes it possible to keep the damper in place when it is destroyed under the effect of high-amplitude vibrations and thus to prevent the electronic module from being completely detached from the fixed structure of the nacelle.

Such a yoke and the fastenings associated therewith have a certain weight which runs counter to the constant search for weight reduction specific to the aviation field.

Moreover, such a yoke and its fastenings constitute additional parts which the maintenance technicians might forget to reinstall during replacement and/or maintenance operations.

BRIEF SUMMARY

A vibration damper is provided capable of being interposed between an electronic module and a fixed structure of an aircraft nacelle, comprising a block made of elastic material, a screw for fastening this block to said fixed structure, and means for fastening said module to said block, notable in that it comprises means for limiting the travel of said fastening means relative to said fastening screw in at least two directions of the space, these limiting means being dimensioned to prevent a strain on said screw that can lead to its fatigue and/or its breakage.

The presence of these travel-limiting means makes it possible, in the event of vibration rates of very high amplitude, to short-circuit the damping screw with respect to the transmission of the dynamic forces between the fixed structure of the nacelle and the electronic module, and thus avoid subjecting this screw to forces capable of leading to its breakage.

By virtue of these travel-limiting means, a damper is therefore obtained which is no longer likely to break in the event of vibration rates of high amplitude which may occur particularly at the time of an FBO (breakage of a turbojet blade) and during the time of the aircraft's return following the FBO.

According to other optional features of the damper according to the invention:
- said limiting means are capable of limiting said travel in a plane perpendicular to said screw: these limiting means remove the risks of the screw shearing;
- said limiting means are capable of limiting said travel in at least one direction of a line parallel to said screw;
- said limiting means comprise on the one hand a dish capable of being fastened to said fixed structure, and on the other hand an impactor secured to said fastening means and positioned inside said dish, this dish and this impactor being separated in directions perpendicular and parallel to said screw by gaps such that the strain on said screw corresponding to the abutment of said impactor inside said dish is situated beyond the threshold of fatigue and/or of breakage of said screw: this embodiment with a dish and with an impactor makes it possible to obtain very simply a limitation of travel in the plane perpendicular to the screw and in the direction of a compression of the screw; the gaps are chosen so that no contact between the dish and the impactor is capable of changing the behavior of the damper in nominal stresses;
- said impactor is coated with an elastomer on its face designed to interact with said dish: this coating limits the intensity of the impact between the impactor and the dish, in the event of these two parts butting against one another;
- said block made of elastic material is formed like a double cone and said fastening means comprise a fastening washer held between the two cones of said double cone: this elastic block thus formed has great damping efficiency;
- said impactor is mounted on said fastening means so as to sandwich a portion of said electronic module: this arrangement makes it possible to produce a robust connection of the electronic module with the damper;
- this damper comprises a pull-out prevention stop: this stop makes it possible to limit the pulling out of the movable portion of the damper from the fixed portion at exceptional vibration rates.

The present invention also relates to an aircraft nacelle comprising a fixed structure and at least one electronic module mounted on this fixed structure by means of at least one damper according to the foregoing.

BRIEF DESCRIPTION OF THE DRAWINGS

Other features and advantages of the present invention will appear in the light of the following description and on examination of the appended figures in which.

DETAILED DESCRIPTION

Figure 1:
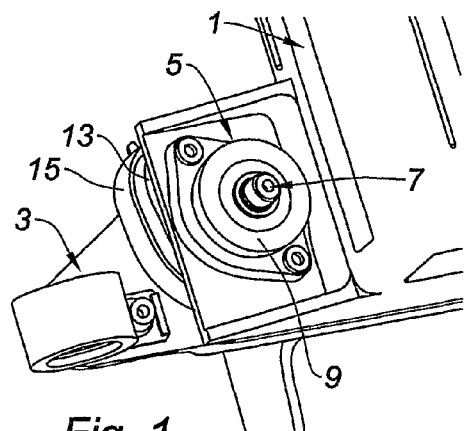
FIG. 1 represents partially and in perspective an electronic module fastened to a fixed structure of an aircraft nacelle by means of a vibration damper according to the invention.

With reference now to FIG. 1, a portion of an electronic module 1 can be seen which may comprise for example electronic components making it possible to control actuators of an aircraft nacelle.

These actuators may be used in particular to open movable portions of a nacelle during maintenance operations.

The fixed portion of this nacelle, that is to say the portion of this nacelle on which the movable portions are mounted, can be seen partially at 3 in FIG. 1.

The electronic module 1 is fastened to the structure 3 by means of a plurality of dampers of which one 5 is shown in FIG. 1.

Figure 2:
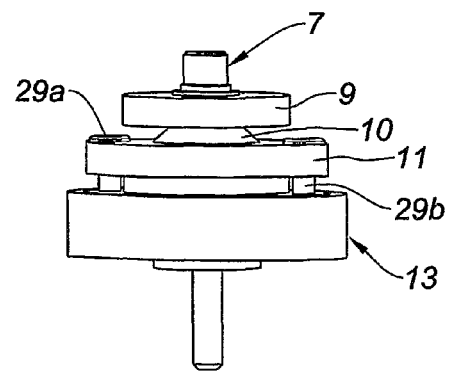
FIG. 2 represents a view in perspective of this damper.
Figure 3:
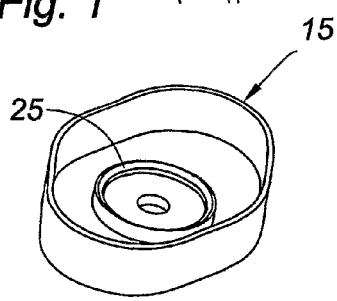
FIG. 3 represents a view in perspective of the cup of this damper.
Figure 4:
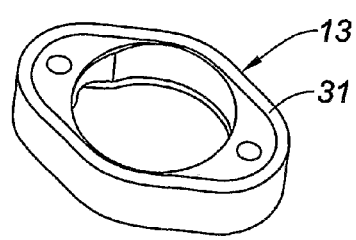
FIG. 4 represents in perspective the impactor of this damper.

With reference more particularly to FIGS. 2 to 4, it can be seen that this damper comprises a screw 7 passing through, in this order, a pull-out prevention stop 9, a block 10 made of elastic material, a fastening washer 11, an impactor 13 and a cup 15 which may also be designated by the term "dish".

Figure 5:
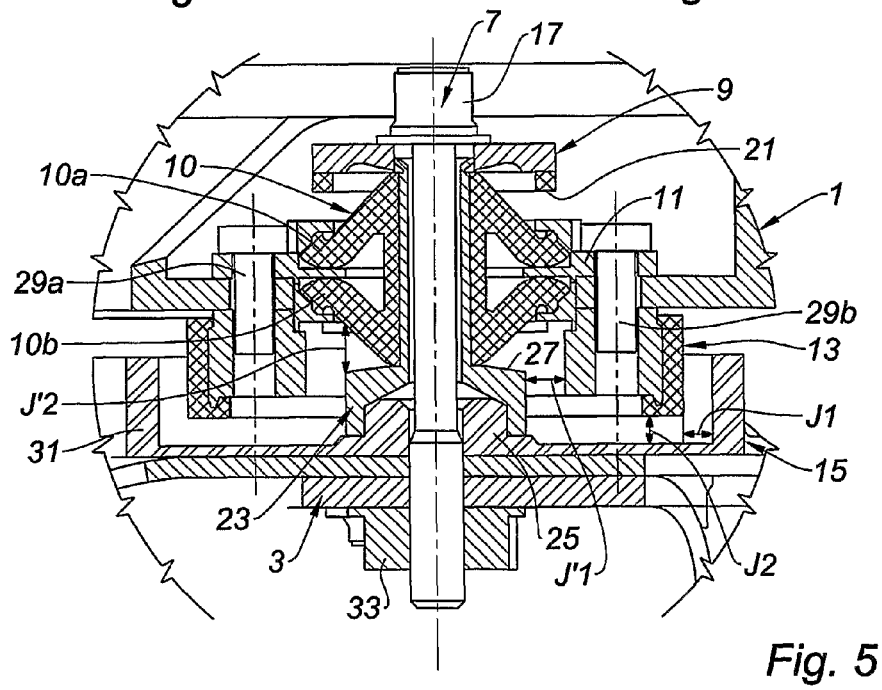
FIG. 5 is a view in axial section of the damper according to the invention, fastened respectively to the electronic module and to the fixed structure of the nacelle of FIG. 1.

With reference more particularly to FIG. 5, it can be seen that the pull-out prevention stop 9 has the shape of a washer wedged against the head 17 of the screw 7.

In its portion situated facing the fastening washer 11, the pull-out prevention stop 9 comprises a rim 21 made of elastomer.

The screw 7 passes through a spacer 23 butting respectively against the head 17 of this screw and against the bottom of the cup 15 on which a centering rim 25 is arranged.

The spacer 23 defines a shoulder 27 and the block 10 made of elastic material is pinched between the pull-out prevention stop 9 and this shoulder 27.

More particularly, the block 10 made of elastic material has the shape of a double cone, the two opposite-facing cones of which 10a and 10b pinch the fastening washer 11.

This washer is itself fastened by at least two screws 29a, 29b to the impactor 13, the electronic module 1 being sandwiched between this fastening washer 11 and this impactor 13.

Preferably, this impactor 13 comprises, on its periphery, an elastomer coating 31.

The impactor 13, which is placed inside the cup 15, as can be seen in FIG. 5, is separated from this cup over the whole of its periphery by a first gap J1 smaller than the gap J'1 separating the inside of the impactor 13 from the spacer 23.

The cup 15 is secured to the structure 3 so that all the stresses due to the impacts of the impactor 13 are directly transmitted to this structure 3.

It will be noted moreover that the bottom of the impactor 13 is separated from the bottom of the cup 15 by a second gap J2 smaller than the gap J'2 separating the fastening washer 11 from the shoulder 27 of the spacer 23.

The screw 7 passes through the fixed structure of the nacelle 3 to which it is fastened by means of a nut 33.

The operating mode and the advantages of the damper which have just been described are a direct result of the foregoing.

In novel operating mode, that is to say when the vibrations of the nacelle do not exceed a predetermined threshold, these vibrations are transmitted by the fixed structure of the nacelle 3 to the electronic module 1 via the block 10 made of elastic material, the impactor 13 being able to move freely inside the cup 15, both in the direction of the screw 7 and in a plane perpendicular to this screw.

When the vibrations of the fixed structure of the nacelle 3 exceed said predetermined threshold, for example following a blade breakage of the turbojet situated inside the nacelle ("Fan Blade Out"), the impactor 13 is capable of abutting the inside of the cup 15 either in the direction of the first gap J1, or in the direction of the second gap J2.

This abutment is damped by the elastomer coating 31 placed on the periphery of the impactor 13.

This abutment allows a direct transmission, that is to say without passing through the screw 7, of the dynamic forces from the cup 15 to the impactor 13.

This in some way short-circuits the screw 7, which makes it possible to prevent subjecting this screw to excessive bending and/or shearing and, to a lesser degree, compression forces capable of causing its fatigue and/or its breakage.

It will be noted that providing for the gaps J1 and J2 to be smaller respectively than the gaps J'1 and J'2, ensures that the transmission of the dynamic forces in these extreme situations travels through the impactor and the cup 15 which are sized appropriately and incorporate damping properties and not through other more fragile parts of the damper such as the screw 7.

The pull-out prevention stop 9 makes it possible to limit the travel of the fastening washer 11 in a direction that would lead to the pulling out of the block 10 made of elastic material. In this particular stress mode, the screw works in tension, its usual and preferred mode.

As can be understood in the light of the foregoing, the damper according to the invention makes it possible to ensure that, beyond a certain vibration threshold, the dynamic forces transmitted by the nacelle fixed structure 3 to the electronic module 1 no longer pass through the screw 7, making it possible to prevent fatiguing and/or breaking this screw.

Naturally, the sizing of the gaps J1 and J2 is carried out according to the mechanical characteristics of the screw 7 according to conventional methods within the scope of those skilled in the art.

In other words, these gaps J1 and J2 are big enough to allow normal operation, that is to say resting on the elasticity of the block 10, in the normal vibration ranges, and small enough to ensure a direct transition of the dynamic forces between the cup 15 and the impactor 13 in the event of exceptional vibrations.

Because of the presence of a means for limiting the travel of the movable portion of the damper relative to its fixed portion, any risk of destruction of the screw 7 is prevented at exceptional vibration rates, and so it is no longer necessary to provide additional security means such as a yoke (as was the case in the prior art) in order to prevent the risk of the electronic module 1 detaching from the nacelle fixed structure 3.

Naturally, the present invention is in no way limited to the embodiments described and shown which are provided simply as examples.

The invention claimed is:

1. A vibration damper interposed between an electronic module and a fixed structure of an aircraft nacelle, the vibration damper comprising:
   a block made of elastic material;
   a screw fastening the block to said fixed structure, said screw passing through a fastening washer;
   fastening means to fasten said electronic module to said block; and
   means for limiting the travel of said fastening means relative to said fastening screw in at least two directions, said limiting means comprising a cup capable of being fastened to said fixed structure and an impactor moving freely inside said cup, the impactor being secured to said electronic module by at least two fasteners and said electronic module fastened between the fastening washer and the impactor, and the at least two fasteners passing through the fastening washer, wherein the impactor is separated from the cup over its radially-outer periphery by a gap "J1" and from an axially-outer periphery of the cup by a gap "J2", the gap "J1" being smaller than a gap "J'1" separating a radially inner periphery of said impactor from a spacer, which said screw passes through.

2. The damper as claimed in claim 1, wherein said limiting means are capable of limiting said travel in a plane perpendicular to said screw.

3. The damper as claimed in claim 1, wherein said limiting means are capable of limiting said travel in at least one direction of a line parallel to said screw.

4. The damper as claimed in claim 2, wherein the cup and the impactor are separated in directions perpendicular and parallel to said screw by the "J1" and "J2" gaps, respectively, such that strain on said screw corresponding to an abutment of said impactor inside said cup is situated beyond a threshold of fatigue and/or of breakage of said screw.

5. The damper as claimed in claim 4, wherein said impactor is coated with an elastomer on a face interacting with said cup.

6. The damper as claimed in claim 4, wherein a portion of said electronic module is sandwiched between said fastening means and said impactor.

7. The damper as claimed in claim 1, further comprising a pull-out prevention stop.

8. An aircraft nacelle comprising the fixed structure and the electronic module mounted on the fixed structure by means of at least one damper as claimed in claim 1.

9. The damper as claimed in claim 3, wherein the cup and the impactor are separated in directions perpendicular and parallel to said screw by the "J1" and "J2" gaps, respectively, such that strain on said screw corresponding to an abutment of said impactor inside said cup is situated beyond a threshold of fatigue and/or of breakage of said screw.

10. The damper as claimed in claim 9, wherein said impactor is coated with an elastomer on a face interacting with said cup.

11. The damper as claimed in claim 9, wherein said impactor is mounted on said fastening means, a portion of said electronic module being sandwiched between said fastening means and said impactor.

* * * * *